Aug. 15, 1944.    R. B. STANLEY    2,356,097
INDEXING MECHANISM
Filed Sept. 9, 1943    4 Sheets-Sheet 1
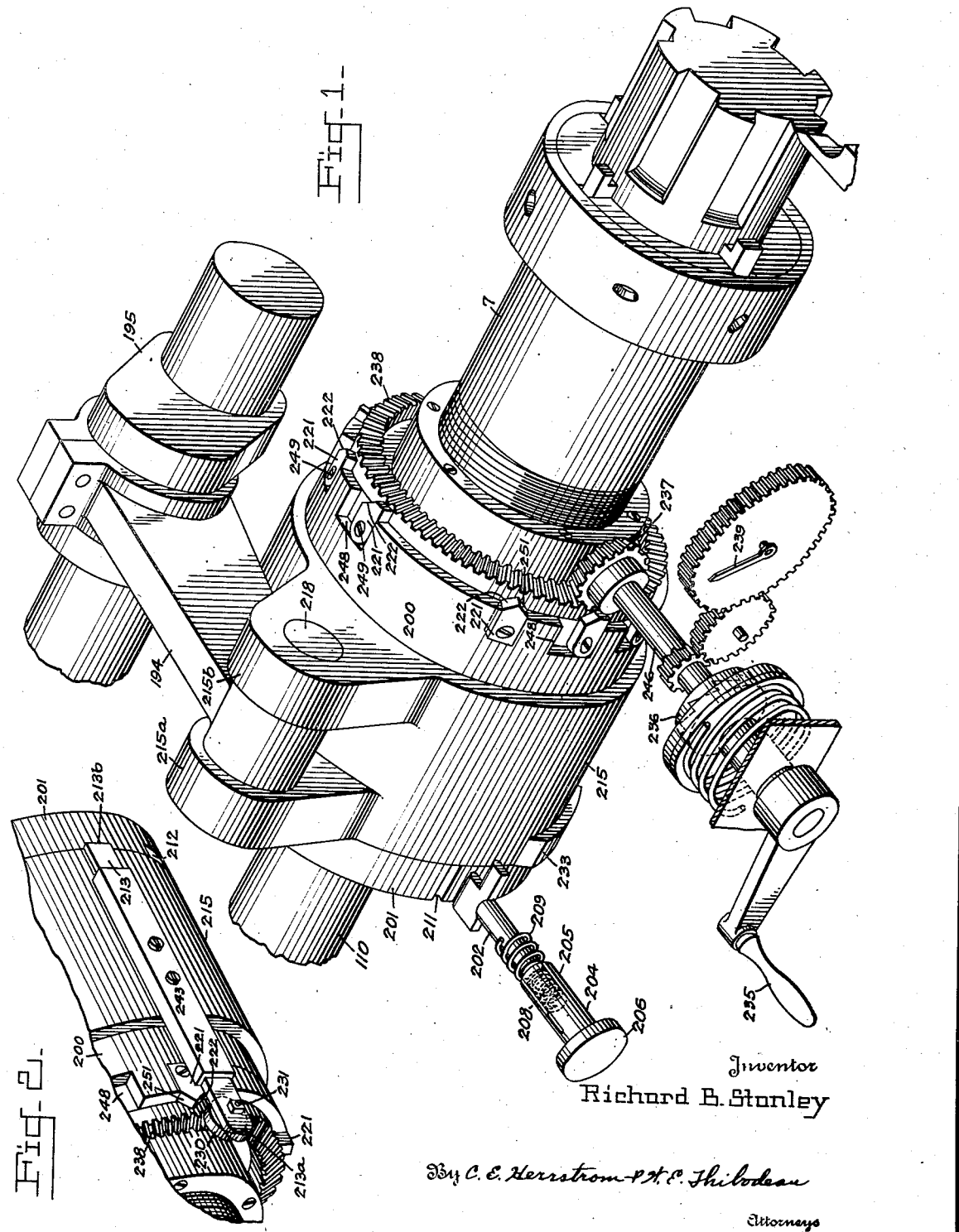
Inventor
Richard B. Stanley
By C. E. Herrstrom & H. E. Thibodeau
Attorneys Aug. 15, 1944.  R. B. STANLEY  2,356,097
INDEXING MECHANISM
Filed Sept. 9, 1943  4 Sheets-Sheet 2
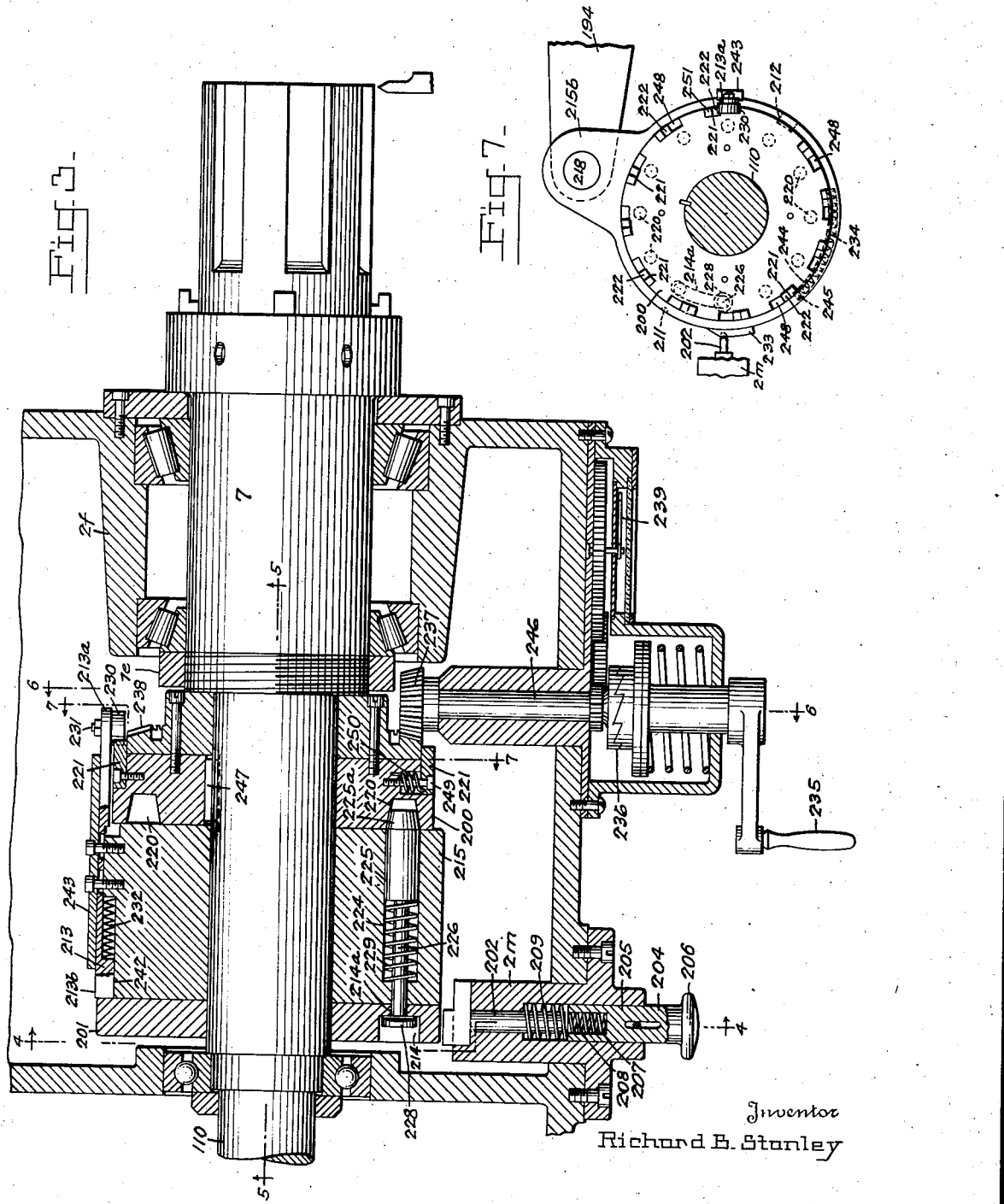
Inventor
Richard B. Stanley
By C. E. Herrstrom & H. E. Thibodeau
Attorneys Aug. 15, 1944.   R. B. STANLEY   2,356,097
INDEXING MECHANISM
Filed Sept. 9, 1943   4 Sheets-Sheet 3
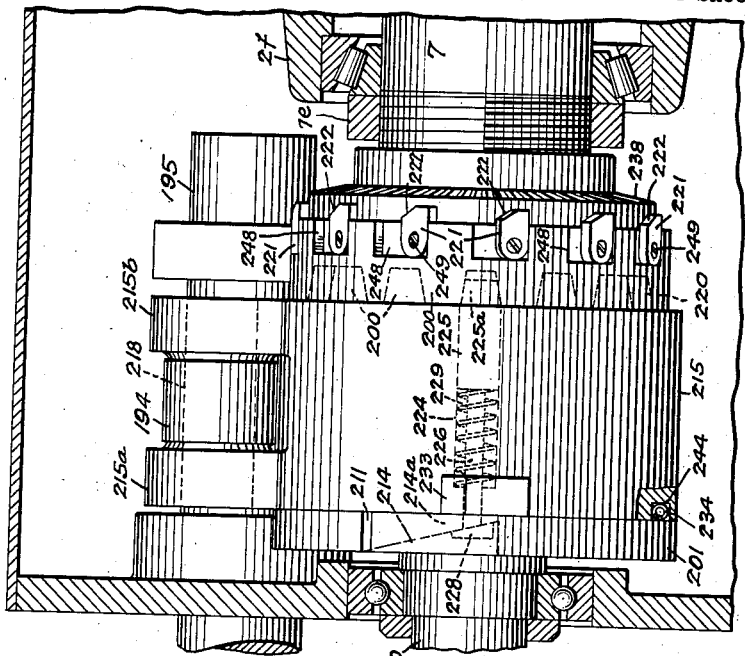
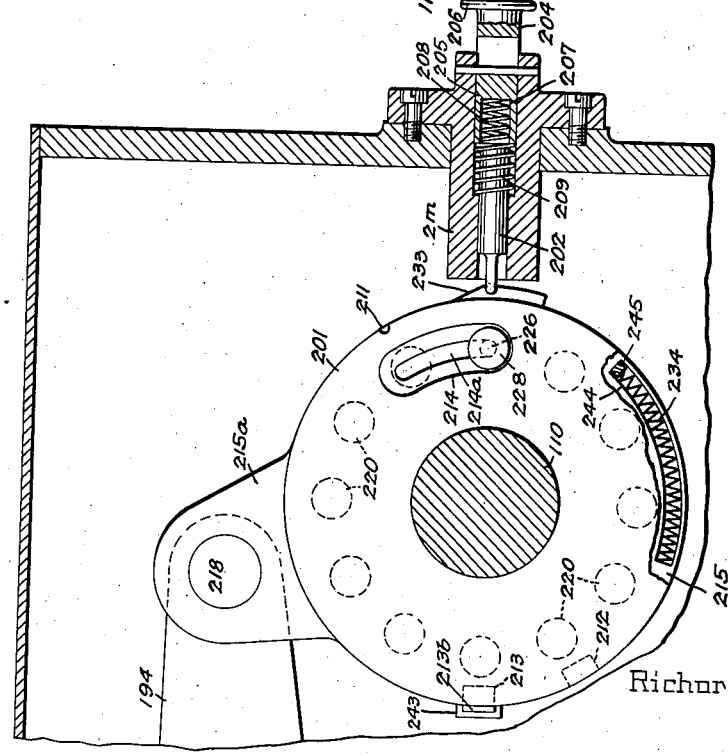
Inventor
Richard B. Stanley
By C. E. Herrstrom & H. E. Thibodeau
Attorneys

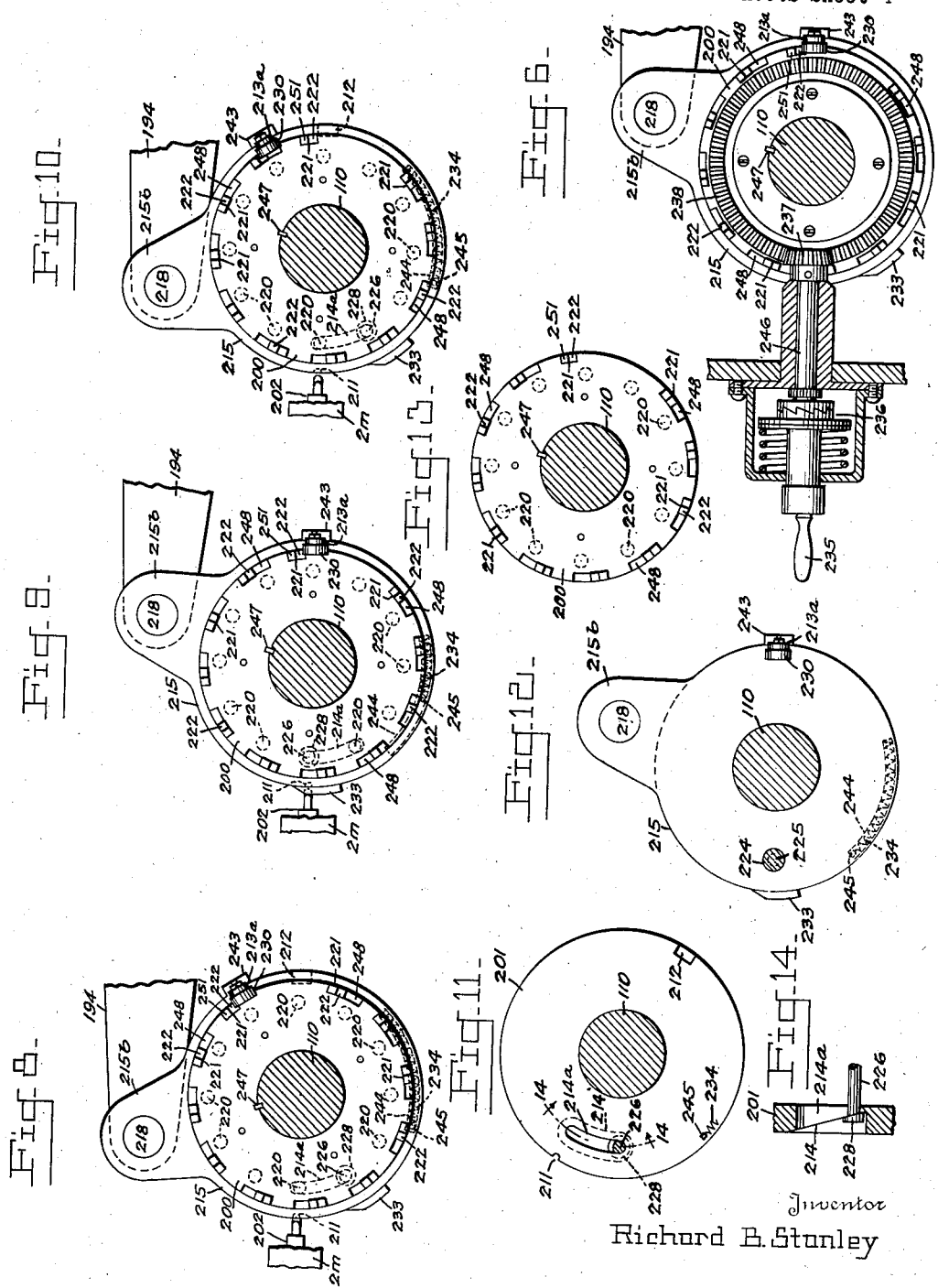

Patented Aug. 15, 1944

2,356,097

UNITED STATES PATENT OFFICE 2,356,097

INDEXING MECHANISM

Richard B. Stanley, Chicago, Ill., assignor to La Salle Designing Company, Chicago, Ill., a partnership composed of Alfred J. Conn, Albert S. Ginsburg, and Abraham Snide Application September 9, 1943, Serial No. 501,710

7 Claims. (Cl. 90—56)

This invention relates to a mechanism for indexing a machine tool, particularly adapted for indexing a breech block thread-cutting machine.

An object of this invention is to provide an indexing mechanism for a machine tool to advance a workpiece into successive angularly displaced machining positions.

A further object of this invention is to provide an indexing mechanism which will cease indexing upon the completion of a desired cycle.

Another object of this invention is to provide an indexing mechanism for a threading machine particularly of the type for threading the breech block of large caliber guns as described in a co-pending application to Alfred J. Conn and Richard B. Stanley, Serial Number 511,298, filed November 22, 1943, and assigned to the assignee of this application.

The specific nature of the invention as well as other objects and advantages thereof will clearly appear from a description of a preferred embodiment as shown in the accompanying drawings in which:

Fig. 1 is a perspective view of the indexing mechanism as applied to the work driving spindle of a machine tool.

Fig. 2 is a similar partial rear view showing the locking bar assembly.

Fig. 3 is a horizontal longitudinal section of part of the headstock of a lathe showing the indexing mechanism of Fig. 1 mounted therein.

Fig. 4 is a fragmentary vertical cross section on the line 4—4 of Fig. 3.

Fig. 5 is a vertical longitudinal section on the line 5—5 of Fig. 3 showing the indexing mechanism in side elevation.

Fig. 6 is a fragmentary vertical cross section on the line 6—6 of Fig. 3 shown on a smaller scale.

Fig. 7 is a similar view with the beveled gears removed and showing the relative positions of the driving drum and the index plate at the beginning of the counterclockwise stroke.

Fig. 8 is a similar view showing the driving drum and the index plate at the end of the counterclockwise stroke and also the end of one cutting operation. Hand operated plunger is depressed to index to next position.

Fig. 9 is a similar view showing the clockwise stroke of the driving drum to advance the indexing operation one step.

Fig. 10 is a similar view showing the mechanism oscillating to produce a cut at the second position.

Fig. 11 is a detail view of the cam plate.

Fig. 12 is a similar view of the driving drum.

Fig. 13 is a similar view of the indexing plate.

Fig. 14 is a sectional view on the line 14—14 of Fig. 11.

In threading certain components where the thread of such component is interrupted by a series of steps, conventional threading equipment cannot be utilized conveniently. One such component is the interrupted thread breech block of large caliber guns. Each step of such breech block has to be threaded separately. This is conveniently accomplished by a machine such as described in a co-pending application to A. J. Conn and Richard B. Stanley, Serial Number 511,298, filed November 22, 1943.

With such a machine however it is necessary to have some form of indexing mechanism to advance the work piece to a new position after the threading of one portion has been completed. Briefly, this is accomplished in accordance with this invention by disengaging the work piece from the driving mechanism at the completion of the first threading operation and bringing the work piece again into locked relation with the driving mechanism at a new angular position. Such procedure will then advance the work so that threading of the next step may be accomplished by the threading machine. Many other applications of such indexing mechanism will suggest themselves to those skilled in this art and this invention is independent of any particular application to which it is applied.

There is shown in assembled relation in Fig. 1 a perspective view of a portion of the barrel threading machine described in the above-mentioned co-pending application. The apparatus to be described is preferably located within the headstock 2 of the particular machine tool to which it is applied. Suitably mounted within the headstock is a crank shaft 195 driven by a suitable power source (not shown). A connecting rod 194 is secured to the crank shaft 195 and transmits an oscillating motion to a driving drum 215 rotatably mounted on a shaft 110 which is in turn rotatably mounted in the headstock. The end of the shaft 110 is enlarged to form a work supporting spindle 7 which is rotatably mounted in a bushing 2f of the headstock 2. Physical connection of the spindle 7 to the driving drum 215 in proper angular relation is effected by the indexing mechanism constituting this invention.

A cam plate 201 which is approximately the same diameter as drum 215 is freely mounted on a shaft 110 by means of a centrally bored hole and is placed adjacent to driving drum 215. Cam plate 201 comprises a thin cylindrical plate and is provided with a transverse slot 211 on its outer periphery. A plunger 202 is suitably mounted in an integral bushing 2m in the front wall of the headstock 2 opposite the periphery of cam plate 201. The end of plunger 202 is suitably shaped for engagement in slot 211. The end of plunger 202 (Fig. 3) is also of sufficient width so as to engage a small portion of the outer surface of drum 215 adjacent cam plate 201. For actuating plunger 202, a hand plunger 204 is provided mounted in the forward portion of bushing 2m.

The plunger 204 comprises a cylindrical portion 205 projecting out of bushing 2m and a suitable hand knob 206 mounted on the projecting end. An axial hole 207 is provided in the inner end of cylindrical portion 205 to accommodate the end of plunger 202. A spring 208 is placed in the bottom of hole 207 and another spring 209 is placed about the end of plunger 202 adjacent plunger 204. When pressure is applied to knob 206, plunger 204 is forced inwardly compressing springs 208 and 209. Plunger 202 will in turn be forced into contact with drum 215 and into engagement with slot 211, when it is rotated into aligned position. A cam projection 233 secured to the outer periphery of drum 215, near the end of drum 215 and adjacent cam plate 201, is provided to disengage plunger 202 from slot 211 in cam plate 201.

A recess 212 is provided on the face of cam plate 201 adjacent drum 215 to receive the end 213b of a locking bar 213 to be described. A wedge shaped arcuate cut 214 is provided in the non-adjacent face of cam plate 201. An arcuate slot 214a is provided in cam plate 201 co-extensive with the cut 214.

Drum 215 is a cylindrical member provided with two oppositely disposed lugs 215a and 215b which project outwardly from the arcuate surface of the drum. Connecting rod 194 is pivotally mounted between the lugs 215a and 215b on a pin 218. In this manner power is transmitted to driving drum 215 to oscillate the drum about shaft 110. The extent of oscillation of course may be varied by proportioning the throw of the crankshaft 195 with respect to the drum 215. In this particular application an oscillation of 32° is imparted to the drum 215.

Near the spindle end of shaft 110, adjacent the opposite side of drum 215, is an index plate 200 secured to the shaft 110. On the surface of index plate 200 adjacent drum 215 there are provided equally spaced tapered holes 220 extending around the periphery of index plate 200. The number of such holes varies with the number of indexing operations desired. Since there are 12 stepped surfaces there are 12 such holes 220 provided, spaced 30° apart.

On the periphery of index plate 200 there are mounted a plurality of cam dogs 221. Eleven such cam dogs are provided and with the exception of the number one and number eleven cam dog, these dogs are spaced 30° apart around the periphery of index plate 200. The angular distance between number one cam dog and number eleven will thus be 60°. Each cam dog 221, except number one, is pivotally mounted by a bolt 249 in a recess 248 in the periphery of index plate 200. Each of the cam dogs 221 is provided with a single sloping cam surface 222 on one edge which projects beyond index plate 200. The side of each cam dog 221 opposite the sloped cam surface 222 is in abutment with one side of recess 248. For each cam dog except the number one, a torsion spring 250 (Fig. 3) is suitably mounted around each bolt 249 and biases each dog 221 into an abutting position with respect to the side of each recess 248. The remaining side surfaces of each dog 221 are arcuately shaped permitting the dog to be pivoted in a direction away from abutment against the side of each recess 248 and hence stressing torsion spring 250. The number one cam dog is however rigidly secured to the periphery of index plate 200 and has a sloped cam surface 222 identical to that on cam dogs 221 plus an oppositely sloped cam surface 251 (Fig. 1).

Near the periphery of driving drum 215 there is provided a transverse hole 224 (Fig. 3) parallel to the axis of the drum and of suitable shape to accommodate an indexing plate locking pin 225. One end 225a of pin 225 is tapered to engage any one of the twelve tapered index holes 220 provided on the inside surface of index plate 200 adjacent drum 215. Shank 226 of pin 225 is of somewhat reduced diameter and passes through hole 224 in drum 215 out through arcuate slot 214a in cam plate 201 and terminates in a head 228, the under surface of arcuate cut 214 in cam plate 201. A spring 229 surrounding reduced shank portion 226 of pin 225 is placed within a suitably counterbored portion of hole 224 and bears against the somewhat larger diameter of the tapered end of pin 225 to bias pin 225 into engagement with one of the tapered holes 220 of index plate 200.

A locking bar 213 (Figs. 2 and 3) comprising a narrow rectangular member is slidably mounted in a slot 242 provided in the periphery of driving drum 215, running across the drum and parallel to the axis of the drum. The end 213a of the locking bar 213 projects past the drum somewhat, overhanging the index plate 200. Depending from the end 213a of locking bar 213 which overhangs the index plate 200 is a roller 230 which is secured to locking bar 213 by a bolt 231 in a manner to permit the roller 230 to rotate freely. A spring 232 is provided within a suitable recess in drum 215 and bears against a raised shoulder on the locking bar to bias the locking bar against the inner surface of the cam plate. A cover plate 243 is secured to the periphery of drum 215 by suitable bolts, covering the slot 242 and hence retaining locking bar 213 within the slot 242. As was previously mentioned, the other end 213b of locking bar 213 projects past the other side of drum 215 and can be engaged in the recess 212 (Fig. 2) in cam plate 201. It will be apparent that the length of locking bar 213 is such that it can engage in recess 212 only when it is also in position to be engaged by a cam dog 221.

A spring 234 (Fig. 4) is connected between drum 215 and cam plate 201 in such a manner as to resist clockwise relative movement of the drum 215 with respect to the cam plate 201. An arcuate slot 244 is provided in the surface of drum 215 adjacent cam plate 201 and spring 234 is inserted in the slot 244 and secured to one end thereof. A square stud 245 suitably secured to cam plate 201 projects into slot 244 and one end of spring 234 is secured to one side of the stud 245. Due to the fact that cam plate 201 abuts against drum 215 the spring 234 is thereby retained in slot 244.

Adjacent the right hand face of index plate 200, as viewed in Fig. 3, bevel gear 238 is freely mounted on shaft 110 and suitably secured to index plate 200. The bevel gear 238 is engaged by a small bevel gear 237 which in turn is secured to a shaft 246 which is suitably rotatably supported in the headstock frame and projects through the headstock 2. The shaft 246 is driven through a conventional unidirectional escapement clutch and friction brake 236 which connects with a manually operated crank handle 235. The clutch 236 permits the index plate 200 to be rotated by crank handle 235 only in a counterclockwise direction as viewed in Fig. 1. A dial indicator 239 may also be mounted on the exterior of headstock 2 and connected by suitable gearing to shaft 246 to provide a visual indication of the angular position of the appartus.

The work supporting spindle 7 is rotatably mounted in a bushing 2f provided in the wall of headstock 2. The spindle 7 is secured in bushing 2f by a collar 7e threaded on the periphery of the spindle within headstock 2. Suitable keys 247 insure a rigid connection between spindle 7, bevel gear 238 and index plate 200.

The various parts of the indexing mechanism are initially positioned as follows. The index plate 200 is positioned with respect to drum 215 so that the number one dog 221 is located adjacent to the roller 230 on locking bar 213. This initial location is such that counterclockwise movement of the drum 215 with respect to index plate 200 will bring the roller 230 past the number one cam dog 221 after about 10° of rotational movement. In the initial position of the indexing mechanism the pin 225 should be in engagement with the first of holes 220 in the index plate 200. Hence the head 228 of pin 225 lies in the deepest part of the cut 214 in cam plate 201. Driving power is thus transmitted by the pin 225 from the oscillating drum 215 to the index plate 200 and hence to the spindle 7. In any position of engagement of the pin 225 in one of the holes 220, the end 213b of locking bar 213 is out of alignment with recess 212 in cam plate 201 by an angular distance less than or equal to the angular extent of oscillation of the drum 215. This misalignment is in a clockwise direction as viwed in Fig. 1. The slot 211 in cam plate 201 is so placed as to come into aligned position with respect to plunger 202 near the end of each counterclockwise oscillation of drum 215 as shown in Figs. 8 and 10.

To automatically index the drum 215 with respect to spindle 7 while drum 215 is oscillating, hand knob 206 is manually forced inwardly which compresses springs 208 and 209 and plunger 202 is forced against the surface of cam plate 201. Plunger 202 then engages transverse slot 211 in cam plate 201 at the end of the counterclockwise stroke of drum 215 as shown in Fig. 8 and holds cam plate 201 stationary. As driving drum 215 is reversed and oscillated clockwise as viewed in Fig. 1 the head 228 of pin 225 is forced to ride outwardly along the sloped surface of the cut 214 in cam plate 201 since cam plate 201 is now held stationary by plunger 202. As the head 228 of pin 225 rides along the sloped surface of cut 214, pin 225 is retracted, compressing spring 229, and the tapered end of pin 225 is withdrawn from the first of the tapered holes 220 in index plate 200. At the moment pin 225 is completely withdrawn from hole 220 drum 215 has almost completed its clockwise stroke. Index plate 200 and hence spindle 7 are disconnected from drum 215 and cease to move when pin 225 is withdrawn from hole 220 due to friction brake 236.

During this clockwise stroke of the driving drum 215 the end of locking bar 213 has been bearing against the inside surface of cam plate 201. Just prior to the end of the clockwise stroke the locking bar 213 becomes aligned with and is forced into recess 212 of cam plate 201 by the bias of spring 232. Concurrently cam 233 forces out pin 202 from slot 211 as shown in Fig. 9. Cam plate 201 is thus held in locked relation to driving drum 215 and for the moment becomes an integral part of driving drum 215. The springs 208 and 209 cushion the hand of the operator on knob 206 from any shock resulting from disengagement of pin 202 from the cam plate. Cam plate 201 is now secured to driving drum 215 and is free to move with driving drum 215 on its counterclockwise stroke.

During the preceding clockwise stroke cam plate 201 has been held stationary with respect to driving drum 215 which has been moved relative to it. The spring 234 thus has been tensioned by this movement. The tension of spring 234 exists while cam plate 201 and driving drum 215 are held in locked relation by locking bar 213.

The next counterclockwise stroke of driving drum 215 is now started and after a short movement, about 10° of this stroke, so that pin 225 is well past number one hole 220 in index plate 200, roller 230 on locking bar 213 is engaged by the cam surface 222 of cam dog 221 on the periphery of index plate 200 as shown in Fig. 10. This engagement forces locking bar 213 out of engagement with recess 212. Then cam plate 201 is freed from drum 215 and under the bias of spring 234 moves in the opposite direction from the counterclockwise stroke of driving drum 215. Such action permits locking pin 225 to slide down the arcuate cut 214 provided in cam plate 201 under the bias of spring 229 and thus enter into engagement with the inner surface of index plate 200. The pin 225 then rides along this surface until the completion of the counterclockwise stroke of the drum and at this point the locking pin 225 is aligned with and enters into the second hole 220 which had been brought into its position by the previous clockwise motion of the index plate 200 produced by the drum 215 in the manner described.

The spindle 7 thus has been advanced or indexed in a clockwise direction with respect to the drum 215 by the 30° angular distance between holes 220. Hence the next stepped surface is brought into proper position for the cutting of threads thereon.

The indexing operation is performed eleven times to bring each of the stepped surfaces into position for the cutting of threads. Further indexing of the mechanism after the eleventh time is prevented due to the omission of a cam dog 221 in the space between the number one dog and number eleven dog. Because of such omission after the eleventh index the locking bar 213 cannot be automatically disengaged from cam plate 201. Hence no driving connection between drum 215 and spindle 7 is effected and the operator is thus informed that the indexing has completed one cycle. If a twelfth cam dog were provided the mechanism obviously would index continuously, advancing 30° each time. The indexing apparatus is then returned to the starting position by rotating the crank handle 235 which engages the unidirection clutch 236 and revolves the index plate in counterclockwise direction as viewed in Fig. 1 by means of the gears 237 and 238 attached to the crank handle and to the face of the index plate 200 respectively. All of the cam dogs 221 except number one have no effect on locking bar 213, pivoting around their mounting bolts 249 upon striking roller 230. Thus the cam surface 251 of the number one cam dog 221 strikes the roller 230 and locking bar 213 is disengaged from cam plate 201. Cam plate 201 then revolves under force of tensioned spring 234 and pin 225 engages the number one index hole 220 in index plate 200 thus placing the machine in its original starting position.

I claim:

1. In combination, a work driving shaft, a drum rotatably mounted on said shaft, means for oscillating said drum, an indexing mechanism interconnecting said drum and said shaft, said indexing mechanism comprising an index plate secured to said shaft, said index plate having a plurality of holes concentrically located about its center at a spacing not greater than the extent of oscillation of said drum, a spring pressed plunger in said drum arranged to engage in any one of said holes and thereby drive said work driving shaft, means for retracting said plunger out of engagement in one of said holes at the end of one stroke of the drum, braking means for stopping said index plate at the point of complete retraction, and means for releasing said plunger during the reverse stroke of the drum, said plunger engaging another hole of said index plate at the end of the reverse stroke thereby angularly indexing said work driving shaft with respect to said drum by an amount equivalent to the spacing between said first and second engaged holes.

2. In combination, a work driving shaft, a drum rotatably mounted on said shaft, means for oscillating said drum, an indexing mechanism interconnecting said drum and said shaft, said indexing mechanism comprising an index plate secured to said shaft, said index plate having a plurality of holes concentrically located about its center at a spacing not greater than the extent of oscillation of said drum, a spring pressed plunger in said drum arranged to engage in any one of said holes and thereby drive said work driving shaft, a cam plate rotatably mounted on said shaft adjacent said drum, said cam plate having a cam surface in engagement with said plunger and arranged to retract said plunger from one of said holes when said drum moves relative to said cam plate, resilient means operative between said cam plate and said drum and tensioned by movement of said drum relative to said cam plate, means for locking said cam plate against movement during one stroke of said drum, whereby said plunger is retracted from one of said holes at the end of said stroke, braking means for stopping said index plate at the point of complete retraction, means for releasing said locking means during the reverse stroke of said drum whereby said cam plate is returned to its initial position with respect to said drum by said resilient means, the said return movement of said cam plate releasing said plunger at the end of the said reverse stroke, said plunger engaging another one of said holes, thereby angularly indexing said work driving shaft with respect to said drum by an amount equivalent to the spacing between said first and second engaged holes.

3. In combination, a work driving shaft, a drum rotatably mounted on said shaft, means for oscillating said drum, an indexing mechanism interconnecting said drum and said shaft, said indexing mechanism comprising an index plate secured to said shaft, said index plate having a plurality of holes concentrically located about its center at a spacing not greater than the extent of oscillation of said drum, a spring pressed plunger in said drum arranged to engage in any one of said holes and thereby drive said work driving shaft, means for retracting said plunger out of engagement in one of said holes at the end of one stroke of the drum, braking means for stopping said index plate at the point of complete retraction, a plurality of cams equispaced on the periphery of said index plate, there being one cam for each of said holes, a spring pressed locking bar mounted on said drum, one end of said locking bar arranged to engage said plunger retracting means to hold said means in the fully retracted position for a portion of the reverse stroke, the other end of said locking bar arranged to engage one of said cams as said drum moves relative to said index plate on its reverse stroke, said cam operating to move said locking bar out of engagement with said plunger retracting means, thereby releasing said plunger at the end of the reverse stroke, said plunger engaging another of said holes in said index plate thereby angularly indexing said work driving shaft with respect to said drum by an amount equivalent to the spacing between said first and second engaged holes.

4. In combination, a work driving shaft, a drum rotatably mounted on said shaft, means for oscillating said drum, an indexing mechanism interconnecting said drum and said shaft, said indexing mechanism comprising an index plate secured to said shaft, said index plate having a plurality of holes concentrically located about its center at a spacing not greater than the extent of oscillation of said drum, the number of said holes corresponding to the number of indexing positions desired, a spring pressed plunger in said drum arranged to engage in any one of said holes and thereby drive said work driving shaft, means for retracting said plunger out of engagement in one of said holes at the end of one stroke of the drum, braking means for stopping said index plate at the point of complete retraction, a plurality of cams on the periphery of said index plate, there being one less cam than said holes, all of said cams except the first and last being spaced apart the same angular extent as said holes, a spring pressed locking bar mounted on said drum, one end of said locking bar arranged to engage said plunger retracting means to hold said means in the fully retracted position for a portion of the reverse stroke, the other end of said locking bar arranged to engage one of said cams as said drum moves relative to said index plate on its reverse stroke, said cam operating to move said locking bar out of engagement with said plunger retracting means, thereby releasing said plunger at the end of the reverse stroke, said plunger engaging another of said holes in said index plate thereby angularly indexing said work driving shaft with respect to said drum by an amount equivalent to the spacing between said first and second engaged holes, said plunger being held in retracted position upon completion of successive indexings corresponding to the number of said holes, and means for restoring said indexing mechanism to its original condition.

5. In combination, a work driving shaft, a drum rotatably mounted on said shaft, means for oscillating said drum, an indexing mechanism interconnecting said drum and said shaft, said indexing mechanism comprising an index plate secured to said shaft, said index plate having a plurality of holes concentrically located about its center at a spacing not greater than the extent of oscillation of said drum, the number of said holes corresponding to the number of indexing positions desired, a spring pressed plunger in said drum arranged to engage in any one of said holes and thereby drive said work driving shaft, a cam plate rotatably mounted on said shaft adjacent said drum, said cam plate having a cam surface in engagement with said plunger and arranged to retract said plunger from one of said holes when said drum moves relative to said cam plate, resilient means operative between said cam plate and said drum and tensioned by movement of said drum relative to said cam plate, means for locking said cam plate against movement during one stroke of said drum, whereby said plunger is retracted from one of said holes at the end of said stroke, braking means for stopping said index plate at the point of complete retraction, a spring pressed locking bar mounted on said drum, one end of said locking bar arranged to engage said cam plate after a limited movement of the drum with respect to said cam plate, means for simultaneously releasing said cam plate locking means, whereby the cam plate moves with the drum for a portion of the reverse stroke, means for retracting said locking bar out of engagement with said cam plate before said drum reaches the end of the reverse stroke whereby said cam plate returns to its original position with respect to the drum by the force of said resilient means, said plunger engaging another of said holes in the index plate at the end of the reverse stroke thereby angularly indexing said work driving shaft with respect to said drum by an amount equivalent to the spacing between said first and second engaged holes.

6. In combination, a work driving shaft, a drum rotatably mounted on said shaft, means for oscillating said drum, an indexing mechanism interconnecting said drum and said shaft, said indexing mechanism comprising an index plate secured to said shaft, said index plate having a plurality of holes concentrically located about its center at an angular spacing not greater than the extent of oscillation of said drum, the number of said holes corresponding to the number of indexing positions desired, a spring pressed plunger in said drum arranged to engage in any one of said holes and thereby drive said work driving shaft, a cam plate rotatably mounted on said shaft adjacent said drum, said cam plate having a cam surface in engagement with said plunger and arranged to retract said plunger from one of said holes when said drum moves relative to said cam plate, resilient means operative between said cam plate and said drum and tensioned by movement of said drum relative to said cam plate, means for locking said cam plate against movement during one stroke of said drum, whereby said plunger is retracted from one of said holes at the end of said stroke, braking means for stopping said index plate at the point of complete retraction, a spring pressed locking bar mounted on said drum, one end of said locking bar arranged to engage said cam plate after a limited movement of the drum with respect to said cam plate, means for simultaneously releasing said cam plate, locking means whereby the cam plate moves with the drum for a portion of the reverse stroke, a plurality of cams equispaced on the periphery of said index plate, there being one cam for each of said holes, the other end of said locking bar arranged to engage one of said cams as said drum moves relative to said index plate on its reverse stroke, said cam operating to move said locking bar out of engagement with said cam plate prior to said drum completing its reverse stroke, whereby said cam plate returns to its original position with respect to the drum by the force of said resilient means, said plunger engaging another of said holes in the index plate at the end of the reverse stroke thereby angularly indexing said work driving shaft with respect to said drum by an amount equivalent to the spacing between said first and second engaged holes.

7. In combination, a work driving shaft, a drum rotatably mounted on said shaft, means for oscillating said drum, an indexing mechanism interconnecting said drum and said shaft, said indexing mechanism comprising an index plate secured to said shaft, said index plate having a plurality of holes concentrically located about its center at a spacing not greater than the extent of oscillation of said drum, the number of said holes corresponding to the number of indexing positions desired, a spring pressed plunger in said drum arranged to engage in any one of said holes and thereby drive said work driving shaft, a cam plate rotatably mounted on said shaft adjacent said drum, said cam plate having a cam surface in engagement with said plunger and arranged to retract said plunger from one of said holes when said drum moves relative to said cam plate, resilient means operative between said cam plate and said drum and tensioned by movement of said drum relative to said cam plate, means for locking said cam plate against movement during one stroke of said drum, whereby said plunger is retracted from one of said holes at the end of said stroke, braking means for stopping said index plate at the point of complete retraction, a spring pressed locking bar mounted on said drum, one end of said locking bar arranged to engage said cam plate after a limited movement of the drum with respect to said cam plate, means for simultaneously releasing said cam plate locking means, whereby the cam plate moves with the drum for a portion of the reverse stroke, a plurality of cams on the periphery of said index plate, there being one less cams than said holes, all of said cams except the first and last being spaced apart the same angular extent as said holes, the other end of said locking bar arranged to engage one of said cams as said drum moves relative to said index plate on its reverse stroke, said cam operating to move said locking bar out of engagement with said cam plate prior to said drum completing its reverse stroke, said plunger being held in retracted position upon completion of successive indexings corresponding to the number of said holes, and means for restoring said indexing mechanism to its original condition.

RICHARD B. STANLEY.